(12) United States Patent
Twiner

(10) Patent No.: US 7,179,162 B1
(45) Date of Patent: Feb. 20, 2007

(54) WATER CONNECTED FISH SCALER

(76) Inventor: Johnnie E. Twiner, 1080 Whites Cove, Florence, MS (US) 39073

( * ) Notice: Subject to any disclaimer, the term of this patent is extended or adjusted under 35 U.S.C. 154(b) by 0 days.

(21) Appl. No.: 11/457,337

(22) Filed: Jul. 13, 2006

Related U.S. Application Data (60) Provisional application No. 60/595,567, filed on Jul. 15, 2005.

(51) Int. Cl.
*A22C 25/02* (2006.01)
(52) U.S. Cl. .................................. 452/105
(58) Field of Classification Search ............ 452/1–11, 452/102–105; 119/600–604, 608, 611, 613
See application file for complete search history.

(56) References Cited

U.S. PATENT DOCUMENTS

| | | | |
|---|---|---|---|
| 84,528 A * | 12/1868 | Beaumont et al. .......... 119/602 |
| 1,484,618 A | 2/1924 | Blades | |
| 1,519,689 A * | 12/1924 | Maxson ..................... 452/105 |
| 2,884,658 A | 5/1959 | Johnson | |
| 2,928,118 A | 3/1960 | Hairston | |
| 3,667,086 A | 6/1972 | Sexton | |
| 4,258,452 A | 3/1981 | Adcock et al. | |
| 4,297,765 A | 11/1981 | Altman et al. | |
| 4,339,850 A | 7/1982 | Altman et al. | |
| 4,615,079 A | 10/1986 | Chartrand | |
| 5,823,145 A * | 10/1998 | Hingiss ..................... 119/603 |
| 6,024,052 A * | 2/2000 | Efaw ........................ 119/625 |
| 6,367,421 B1 * | 4/2002 | Deacon ..................... 119/603 |
| 6,857,951 B1 | 2/2005 | Pauley | |
| 6,948,451 B2 * | 9/2005 | Bond et al. ................ 119/665 |

* cited by examiner

*Primary Examiner*—Thomas Price
(74) *Attorney, Agent, or Firm*—McGarry Bair PC

(57) ABSTRACT

A fish scaler assembly for removing scales from a fish such that scales and grime do not accumulate on a scraper. The assembly can be connected to a pressurized water source by threaded coupling having an adapter. A flexible tube on the adapter transports water between the water source and a nozzle attached to the scraper. Water flows from an outlet of the nozzle over the scraper to prevent the accumulation of scales and grime on a scraping portion of the scraper. The outlet of the nozzle is placed at a distance from the scraping portion to prevent to clogging of the outlet.

14 Claims, 7 Drawing Sheets

WATER CONNECTED FISH SCALER

CROSS-REFERENCE TO RELATED APPLICATION

This application claims the benefit of U.S. provisional application Ser. No. 60/595,567, filed Jul. 15, 2005, which is incorporated herein in its entirety.

BACKGROUND OF THE INVENTION

1. Field of the Invention

This invention relates generally to fish scalers, and more particularly to a hand held fish scaler that is connected to a water source.

2. Description of the Related Art

Fishing is a pastime widely enjoyed by many individuals; however, cleaning fish is often an unpleasant task. Removal of scales in particular is a time consuming and messy operation that requires the surface of a fish to be scraped with a scraping element many times in order to remove all of the scales and grime on the fish. As the scales and grime are removed, they tend to collect on the scraping element thereby obstructing it and rendering the scraping element ineffectual. This requires a user to rinse the scraping element with water to remove the scales and grime. Often a scraping element must be rinsed several times during the cleaning of a single fish, greatly adding to the time and effort required for fish cleaning. In addition, upon completion of scale removal the area must be cleaned up and the scales disposed of.

Various fish scraping devices are known that incorporate a continuous flow of water directed at or on the scraping element such that it is continuously rinsed. These devices have a tube connected to a pressurized water source and one or more tube outlets that permit water to flow over the scraping element. Examples of such devices are disclosed U.S. Pat. No. 3,997,086 to Sexton, U.S. Pat. No. 4,258,452 to Adcock et al., U.S. Pat. No. 4,297,765 and U.S. Pat. No. 4,339,850 to Altman et al. and U.S. Pat. No. 4,615,079 to Chartrand. These devices, however, do not satisfactorily solve the above problems. Many of these devices have water outlets that are close to the scraping element and thus as scales are removed the water outlets can become increasing clogged with fish scales and grime such that little or no water can flow over the scraping element.

SUMMARY OF THE INVENTION

A fish scaler according to the present invention comprises a body having a forward scraping portion and a rearward handle portion formed continuously with one another and having a contiguous underside, a plurality of downwardly-depending teeth provided on each lateral side of the forward scraping portion, a grip area provided on the rearward handle portion for a user and a nozzle adapted to be fluidly connected to a source of pressurized water, the nozzle being located longitudinally rearwardly of the grip area.

According to one aspect of the invention, the forward scraping portion can have at least one grip aperture formed therein located between the teeth. The at least one grip aperture can comprise a pair of longitudinally-spaced apertures for gripping by users having differently-shaped hands or comfort positions.

According to another aspect of the invention, an outermost surface of the forward scraping portion can have an inwardly-extending recess which allows the user to maneuver the scraper around fins on the fish being scaled. The recess can be U-shaped and extend toward the rearward handle portion.

According to yet another aspect of the invention, the body can be symmetrical about a longitudinal axis to have utility for either a right-handed or a left-handed user.

According to still another aspect of the invention, the fish scaler can further comprise a tube interconnected with the nozzle that is adapted to be connected with a conventional source of pressurized water. The fish scaler can still further comprise an adapter fluidly interconnected at an opposite end of the tube for adapting the tube for connection to the conventional source of pressurized water. The fish scaler can still further comprise a connector having an adjustable valve for controlling the flow rate of water through the connector and into the tube. The adjustable valve can include a knob for adjustment of the adjustable valve by a user. The fish scaler can further comprise a glove wearable by a user for facilitating grasping the fish being scaled. The glove can comprise a gripping pattern on an exterior surface thereof.

In yet another aspect of the invention, the nozzle can be directed along the underside surface of the body to direct pressurized water exiting the nozzle along the underside of the body toward the teeth on either side of the body, whereby the pressurized water cleans the teeth as the user performs a scraping action on the fish being cleaned. The nozzle can be located at a remote distance from the teeth, whereby debris from a scraping action performed by a user does not tend to clog the nozzle.

DESCRIPTION OF THE PREFERRED EMBODIMENT

Figure 1:
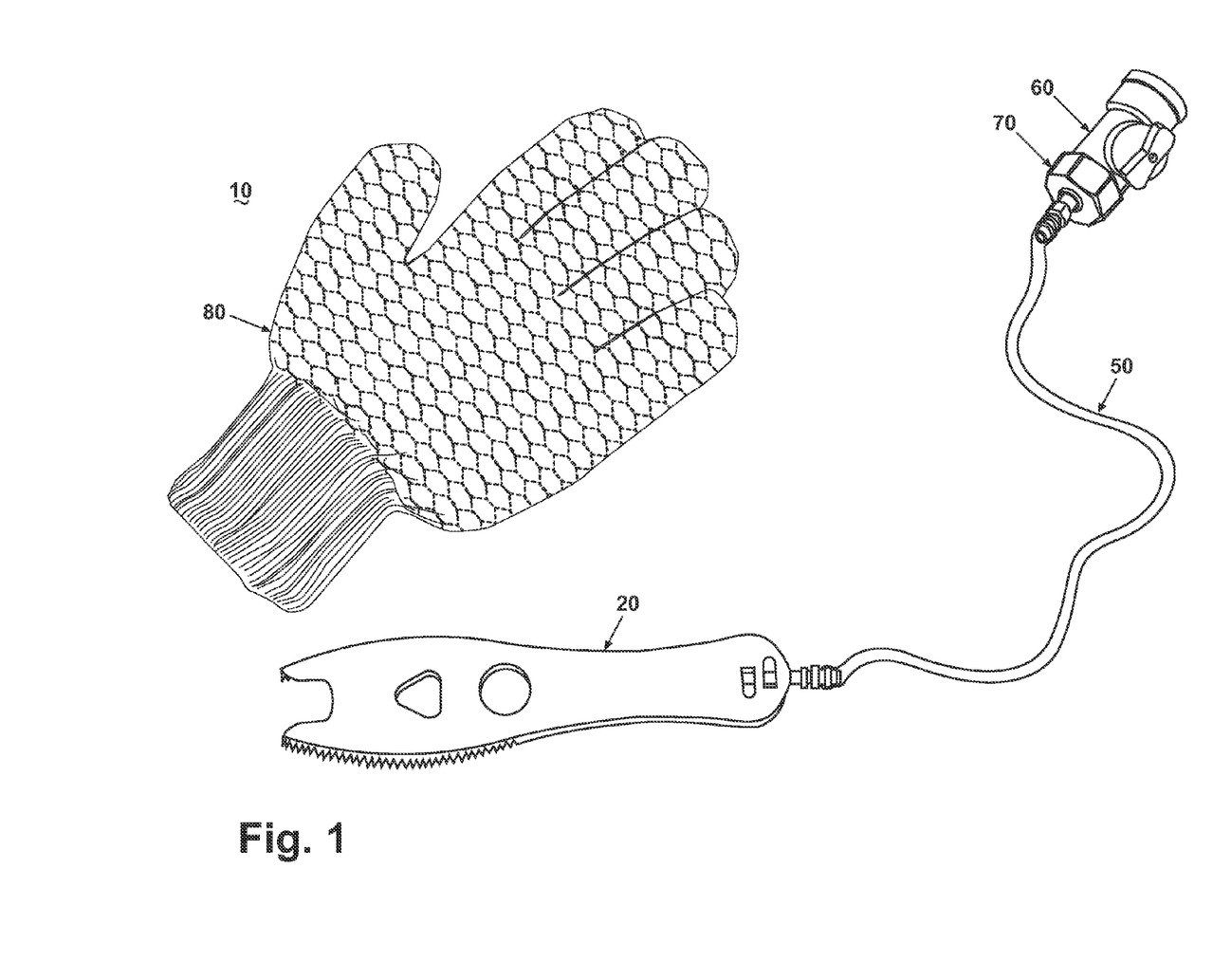
FIG. 1 is a perspective illustration of a fish scaler assembly according to the present invention comprising a fish scraper, a tube, a coupling, an adapter, and a glove.

Referring now to the figures and in particular to FIG. 1, a fish scaler assembly 10 is illustrated comprising a fish scraper 20, a tube 50, a coupling 60, an adapter 70, and a glove 80. It will be understood that the components of the fish scaler assembly 10 shown in the drawings are but specific examples of any of a number of suitable components which could also be used without departing from the scope of this invention.

Figure 2:
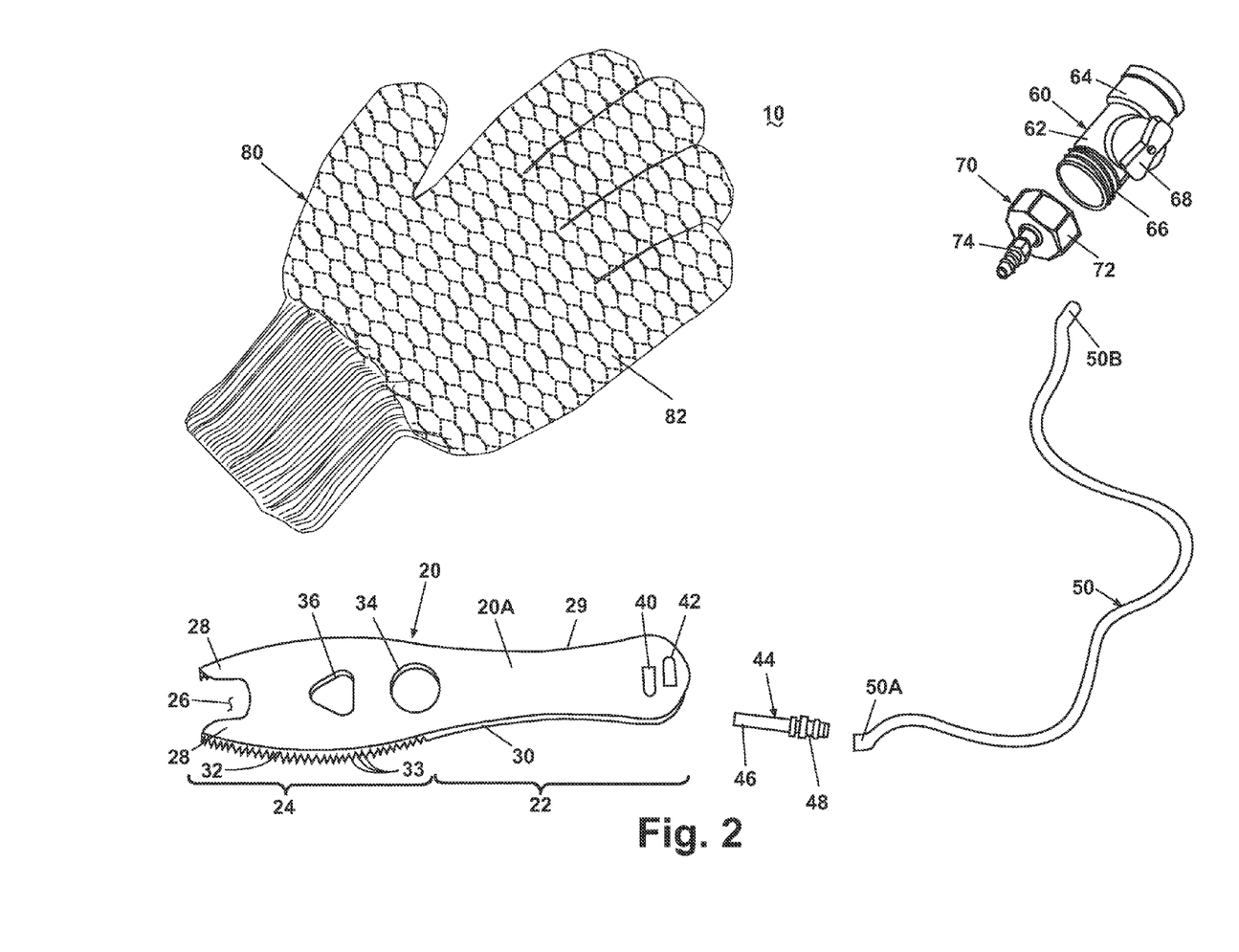
FIG. 2 is an exploded view of the fish scaler assembly from FIG. 1
Figure 3:
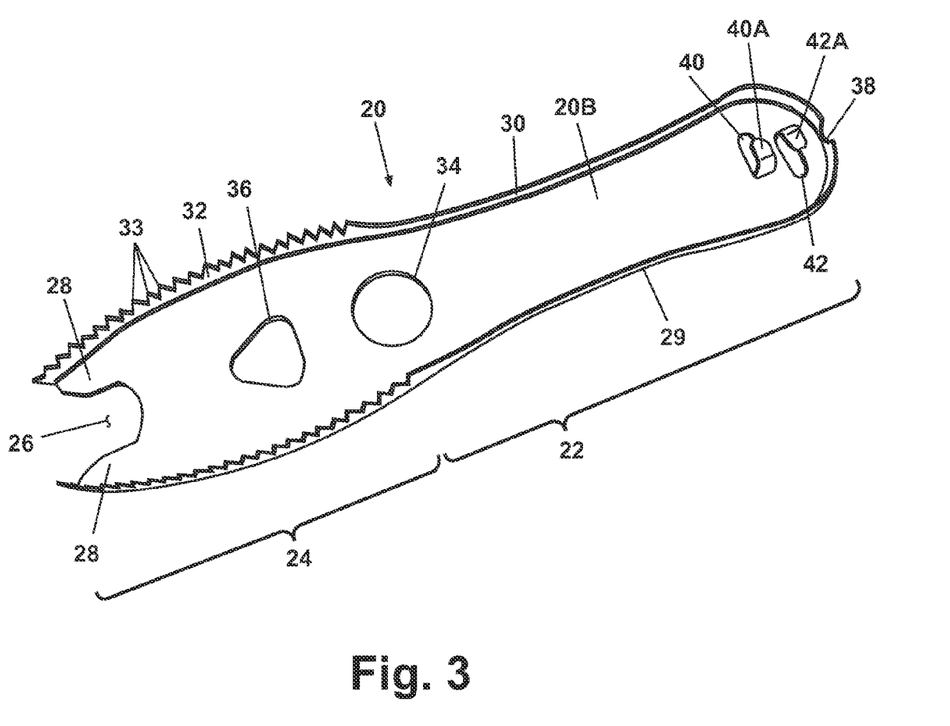
FIG. 3 is a bottom perspective view of the scraper from FIGS. 1 and 2.

Referring to FIGS. 2 and 3, the scraper 20 has an upper surface 20A and a lower surface 20b which define a handle 22 and a scraping portion 24, preferably continuously formed with one another. The scraper 20 is made of a lightweight material and can weigh only a few ounces, such as 2.5 ounces in the example shown in the drawings, which makes use of the scraper 20 easy on the user. The scraper 20 is preferably symmetrical about a longitudinal axis so that it has equal utility for a right- or left-handed user.

A recess 26 is formed at a forward end of the scraping portion 24, preferably generally U-shaped and extending inwardly from the forward end thereof, such that two curved arms 28 are formed. The recess 26 allows the scraper 20 to be maneuvered around some of the harder-to-access areas of the surface to be scraped, for example, around the fins of the fish.

An ergonomically-shaped grip area 29 is provided on the handle 22 and can comprise a narrowed or inwardly-curved portion of the handle that the user may comfortably grip. The grip area 29 can also have a shape corresponding to the shape of a hand, such as integrally formed impressions for the thumb and fingers.

A peripheral flange 30 depends from the upper surface 20A of both the handle 22 and the scraping portion 24 whereby it extends substantially around the perimeter of the scraper 20, terminating at the forward recess 26 to define scraping edges at outer terminal edges of the forward end. The flange 30 has a generally smooth lower edge adjacent to the lower surface 20b of the handle 22, and preferably has a serrated edge 32 adjacent to the lower surface 20b of the scraping portion 24 and extends forwardly to the ends of the arms 28. The serrated edge 32 comprises a plurality of serrations or teeth 33 that are contacted with and scraped across the surface of a fish to be cleaned to remove scales, grime, and other debris therefrom.

In addition to the grip area, the scraper 20 can be provided with one or more apertures that allows users having differently-shaped hands to comfortably grip the scraper 20. In the illustrated embodiment, a circular aperture 34 and a generally triangular aperture 36 are formed in the upper surface 20A of the scraper 20, generally in a central area of the upper surface 20A, intermediate the ends thereof, and wherein the circular aperture 34 is located generally rearwardly of the triangular aperture 36, both located along a longitudinal axis of the scraper 20. The apertures 34, 36 are provided as an optional holding place for the user to grip the scraper 20. The user's finger can be inserted through either of the apertures 34, 36 to achieve a comfortable grip on the scraper 20. As can be seen in the drawings, the apertures 34, 36 are located generally forwardly of the handle 22 of the scraper 20, in an ergonomically-comfortable location for the fingers of most users of the scraper. The longitudinal spacing of the apertures 34, 36 enables users having differently-sized hands to operate the scraper 20 in relative comfort.

A U-shaped slot 38 is formed in the flange 30 at the end of the handle 22. Preferably, the slot 38 begins at a lower edge of the depending flange 30, generally at a rearward end of the handle 22 and aligned with a longitudinal axis of the scraper 22. The slot 38 opens in a generally U-shaped manner toward the upper surface 20A of the handle 22 and terminates slightly prior to reaching the upper surface 20A.

A pair of juxtaposed openings 40, 42 are formed in the upper surface 20A of the handle 22, which material making up the openings 40, 42 are formed downwardly through the upper surface 20A to form opposed arms 40A, 42A. The arms 40A, 42A are preferably formed in an opposed relationship and each comprise a generally L-shaped depending flange cooperating to form a channel with, and longitudinally aligned with, the slot 38 in the flange 30.

Figure 4:
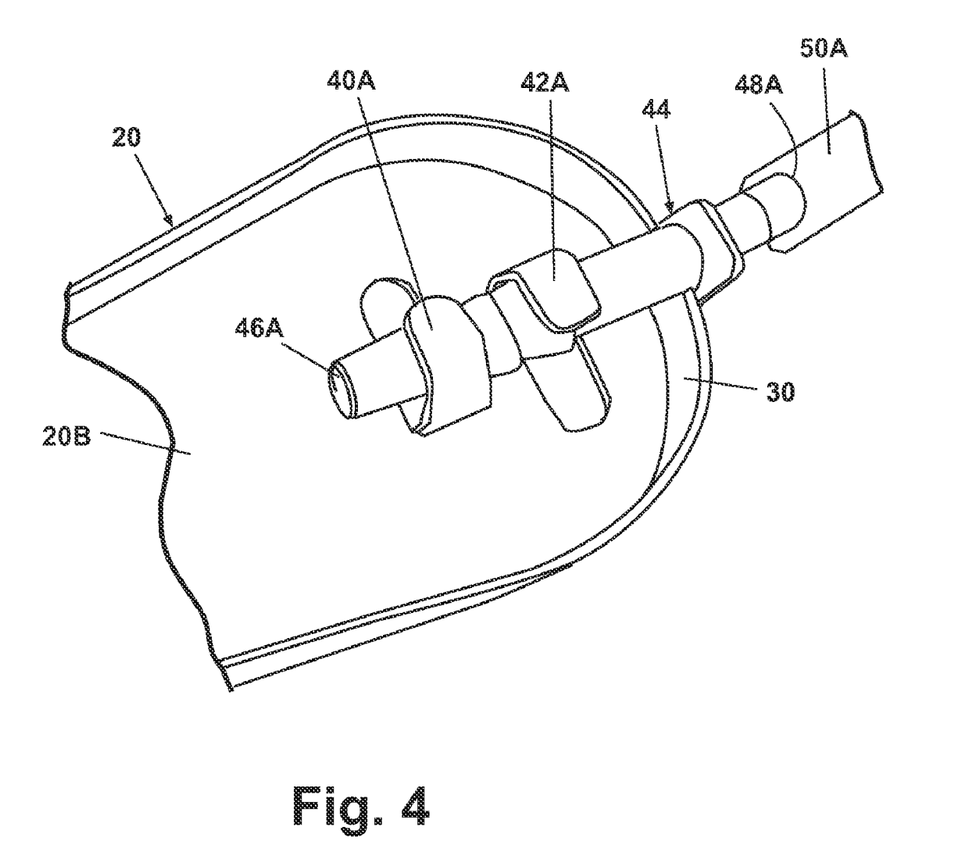
FIG. 4 is a close-up view of the scraper from FIG. 3 illustrating the attachment of a nozzle.

Referring to FIGS. 2 and 4, the scraper assembly 10 also comprises a nozzle 44 comprising a first end 46 with an outlet 46A and a second end 48 with an inlet 48A. The outlet 46A preferably defines a suitable configuration for the pressurized egress of water therefrom when a supply of pressurized water is supplied to the inlet 48A. The second end 48 preferably has a series of ridges 49 thereon, adapted to receive an end of a tube, such as tube 50 described herein, in a press-fit fashion. Alternatively, the second end 48 can be fit with any suitable adapter, such as a compression clamp or threaded fitting, to make it suitable to fluidly interconnect with a pressurized water supply.

The tube 50 is preferably made from a flexible plastic but can be made of any suitable material. The function of the tube is simply to carry water to the inlet 48A of the nozzle 44.

Figure 5:
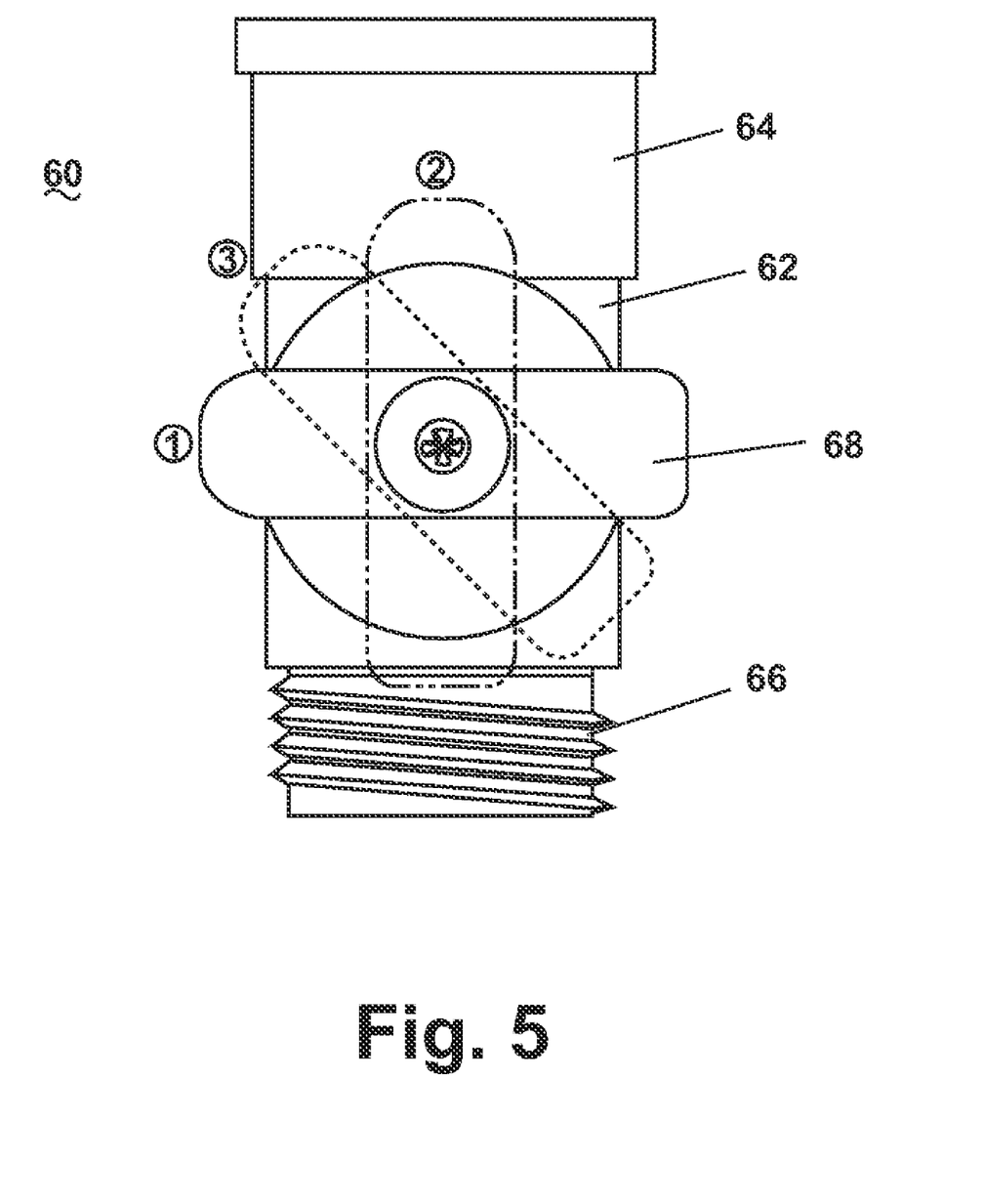
FIG. 5 is a front perspective view of the coupling from FIGS. 1 and 2 illustrating different positions of a knob on the coupling.

Referring to FIGS. 2 and 5, the coupling 60, shown by example in the figures, comprises a hollow body 62 with a first end 64 that is threaded internally for attachment to a pressurized water source, such as a standard outdoor hose or spigot and a second outwardly threaded end 66 that is attached to the adapter 70. A valve (not shown) is contained within the body 62 to control the flow of water through the coupling 60. A knob 68 is preferably provided on the outside of the body 62 and is operably coupled to the valve such that turning the knob 68 in one direction causes the valve to open and allow water to flow through the coupling, and turning the knob 68 in the opposite direction causes the valve to close and stops the flow of water through the coupling 60. The coupling 60, including the body 62, valve, and knob 68, is preferably made of a suitable plastic material, i.e., being sufficiently rigid to withstand numerous cyclic operations and the pressures of the fluid contained therein.

Referring to FIG. 5, for ease of operation, the knob 68 can have a quarter-turn or a ninety degree range of motion such that when the knob 68 is in a horizontal position (Position 1) the valve is closed. By turning the knob 68 clockwise to a vertical position (Position 2) the valve is open. The volume of water flowing through the coupling 60 can be adjusted by turning the knob 68 to any position, for example to roughly 45 degrees (Position 3) between the horizontal position and the vertical position such that water is flowing through the coupling 60, but not at a maximum volume. Other types of valves and modes of actuation can be employed without departing from the scope of this invention, and the substitution of other types of valves would be apparent to one skilled in the art. Markings can preferably be provided on the knob 68 that identifies the direction to rotate the knob 68 to turn the water "ON" and "OFF".

Referring to FIG. 2, the adapter 70 comprises a connector 72 with an inner thread that is sized to fit the second outwardly threaded end 66 on the coupling 60. The adapter 70 further comprises a nozzle 74 that extends from the center of the connector 72. The nozzle 74 preferably has a series of ridges 76 thereon, adapted to receive an end of the tube 50 in a press-fit fashion. Alternatively, the nozzle 74 can be fit with any suitable adapter, such as a compression clamp or threaded fitting, to make it suitable to fluidly interconnect with a pressurized water supply.

The glove 80 is a common knit glove with a gripping pattern 82 adhered to both sides of the glove 80. The gripping pattern 82 allows the user to securely hold a fish without the danger of it slipping. The glove 80 can be worn on the non-scraping hand of the user to grip to fish and is patterned on both sides so that it can be worn on either the left or right hand of the user. The universal/generic glove 80, in combination with the substantially symmetrical scraper 20 allows the fish scaler assembly 10 to be used by a left- or right-handed user.

The assembly of the fish scraper assembly 10 will now be described with respect to the drawings in general. The nozzle 44 is attached to the scraper 20 by placing the nozzle 44 into the U-shaped slot 38 and wrapping the arms 40A and 42A around the first end so that the arms 40A, 42A form a clamp around a portion of the nozzle 44. The nozzle 44 is preferably arranged within the arms 40A, 42A when attached to the scraper 20 such that the outlet 46A is directed along the lower surface 20*b* of the scraper 20. The tube 50 is attached at a first end 50A to the inlet 48A of the nozzle 44 and at a second end 50B to nozzle 74 on the adapter 70 which, in turn, has been attached, such as by threading on, to the end 66 of the coupling 60.

Figure 6:
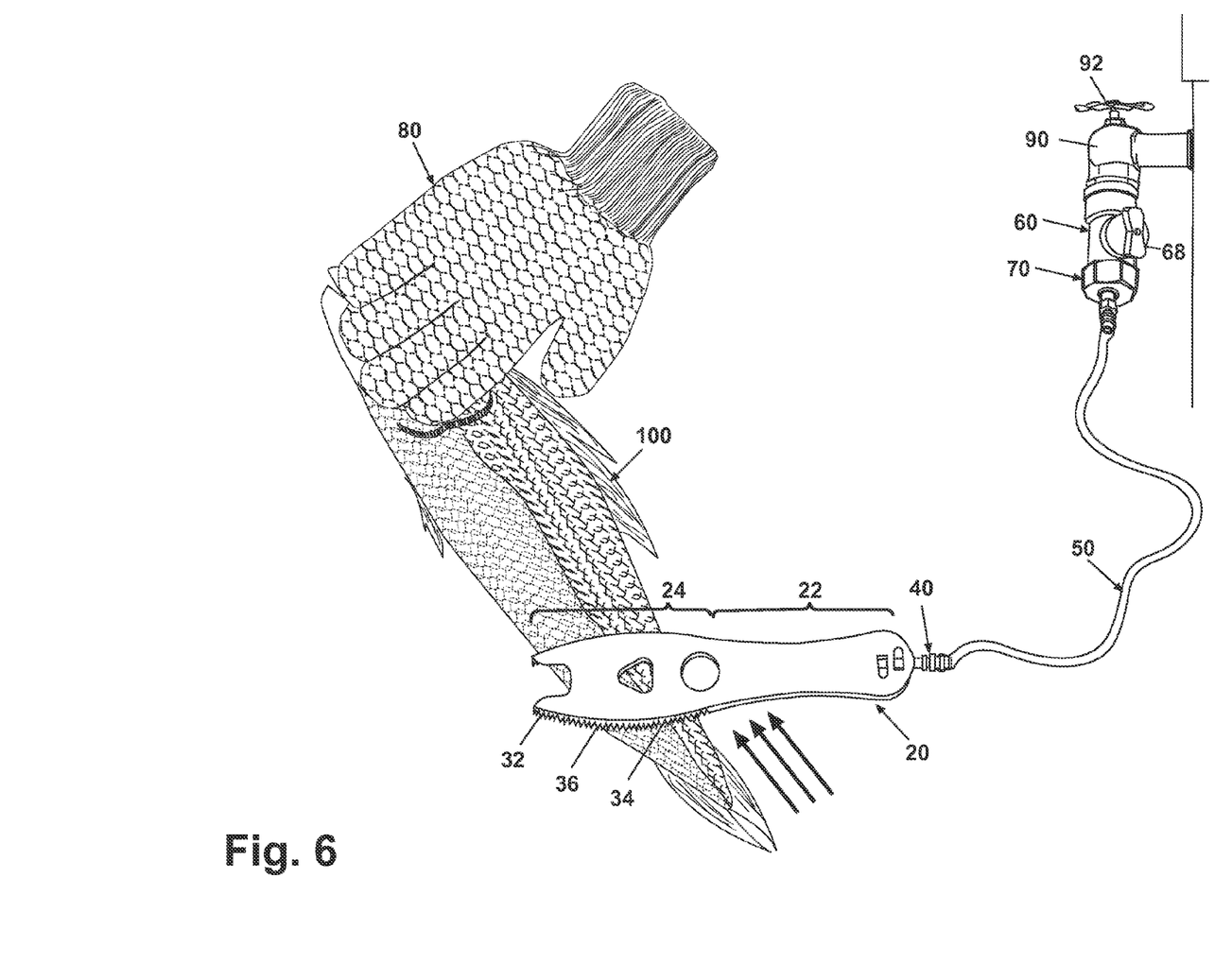
FIG. 6 is a perspective illustration of the fish scaler assembly from FIG. 1 connected to a water source and being used to scale a fish.

Referring to FIG. 6, the utilization of the fish scaler assembly 10 to clean a fish 100 will now be described. First, the end 64 of the coupling 60 is attached to a water source 90, such as an outdoor hose, spigot, or hydrant. The exemplary illustrated water source 90 is a spigot, such as is commonly located on the exterior of a house. Then, the water source 90 is turned on using a water source control 92, allowing water to flow into the coupling. The flow of water through the assembly 10 can be adjusted to a desired volume by the knob 68. This can also be done using the water source control 92 or a by combination of both the knob 68 and the water source control 92. Next, the user dons the glove 80, for example on his or her non-dominant hand and grips a fish 100 to be scaled with their gloved hand. The scraper 20 is held in their non-gloved hand, for example his or her dominant hand, such that a comfortable grip is achieved using any combination of the handle 22 and apertures 34, 36. Then, the user runs the scraping portion 24 over the fish 100, preferably in a direction opposite of the direction of scale growth, so that the serrated edges 32 remove the scales. In other words, the user preferably scrapes in a generally tail-to-head fashion on the fish 100. The scraper 20 can be maneuvered around the fins of the fish 100 as needed using the recess 26.

Figure 7A:
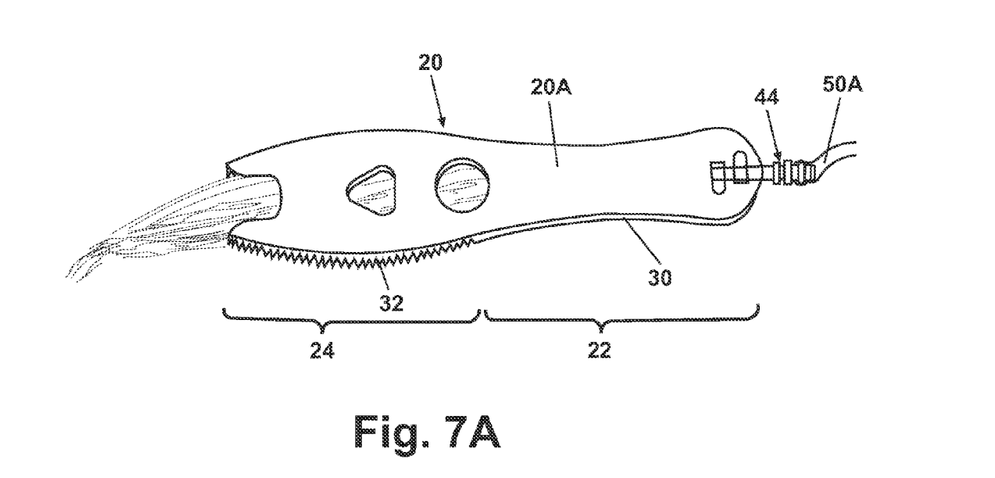
FIG. 7a is a top perspective view of the scraper from FIG. 6 illustrating the flow of water over the scraper.
Figure 7B:
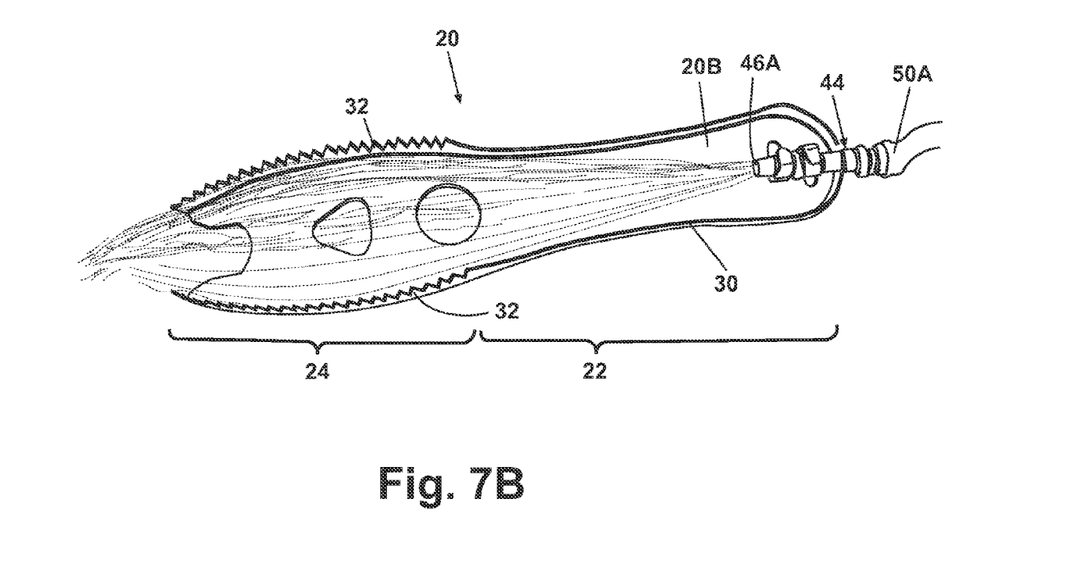
FIG. 7b is a bottom perspective view of the scraper from FIG. 6 illustrating the flow of water over the scraper.

Referring to FIGS. 7*a* and 7*b*, as water exits from the nozzle outlet 46A, it will flow along the lower surface 20*b* of the scraper 20. Immediately after it exits the nozzle 44, it will flow in a generally narrow path along handle 22 and then along a wider path along the scraping portion 24, where it will impinge on the serrated edges 32 where accumulation of scales and grime typically occurs. The continuous impingement of water on these edges 32 keeps the scraper 20 clean and free from debris accumulation. Also, since the nozzle outlet 46A is far from the scraping portion 24, it will not become clogged with debris from the fish 100. After the fish 100 has been scaled, the spray of water from the assembly 10 can be used to rinse other things, for example, the surrounding area, other fishing equipment, the user's hands and the like.

The fish scaler assembly 10 presents several advantages and improvements over other fish scalers. The assembly 10 removes fish scales in a cleaner and more time efficient manner. The elements of the assembly 10, for example, the scraper 20, do not become clogged with fish scales or other debris and do not require interruption of the scale removal process to unclog the assembly 10. The assembly 10 also reduces the time needed for clean-up after scale removal since the water flow can easily be directed to the users hands, other equipment and the surrounding area. Elements of the assembly 10, such as the scraper 20 and glove 80, are symmetrically designed so that a right- or left-handed user can employ the assembly 10. In addition to the symmetrical design, the apertures 34, 36 provide alternate ways of holding the scraper 20 so that a user can achieve a comfortable grip. The adapter 70 and tube 50 allow the scraper 20 to be fluidly coupled with any standard water source, for example an outdoor hose or spigot. The outlet 46A of the nozzle 44 directs water across the bottom surface 20B of the scraper 20 such that the scraping portion 24 and serrated edges 32 are kept clean and free from scales and grime. The outlet 46A is positioned at a distance from the scraping portion 24 so that the outlet 46A will not become clogged with scales or grime.

While the invention has been specifically described in connection with certain specific embodiments thereof, it is to be understood that this is by way of illustration and not of limitation, and the scope of the appended claims should be construed as broadly as the prior art will permit.

What is claimed is:

1. A fish scaler comprising:
    a body having a forward scraping portion and a rearward handle portion formed continuously with one another and having a contiguous underside;
    a plurality of downwardly-depending teeth provided on each lateral side of the forward scraping portion;
    a grip area provided on the rearward handle portion for a user; and
    a nozzle adapted to be fluidly connected to a source of pressurized water, the nozzle being located longitudinally rearwardly of the grip area.

2. The fish scaler according to claim 1, wherein the forward scraping portion has at least one grip aperture formed therein located between the teeth.

3. The fish scaler according to claim 2, wherein the at least one grip aperture comprises a pair of longitudinally-spaced apertures for gripping by users having differently-shaped hands or comfort positions.

4. The fish scaler according to claim 1, wherein an outermost surface of the forward scraping portion has an inwardly-extending recess which allows the user to maneuver the scraper around fins on the fish being scaled.

5. The fish scaler according to claim 4, wherein the recess is U-shaped and extends toward the rearward handle portion.

6. The fish scaler according to claim 1, wherein the body is symmetrical about a longitudinal axis to have utility for either a right-handed or a left-handed user.

7. The fish scaler according to claim 1, and further comprising a tube interconnected with the nozzle that is adapted to be connected with a conventional source of pressurized water.

8. The fish scaler according to claim 7, and further comprising an adapter fluidly interconnected at an opposite end of the tube for adapting the tube for connection to the conventional source of pressurized water.

9. The fish scaler according to claim 8, and further comprising a connector having an adjustable valve for controlling the flow rate of water through the connector and into the tube.

10. The fish scaler according to claim 9, wherein the adjustable valve includes a knob for adjustment of the adjustable valve by a user.

11. The fish scaler according to claim 10, and further comprising a glove wearable by a user for facilitating grasping the fish being scaled.

12. The fish scaler according to claim 11, wherein the glove comprises a gripping pattern on an exterior surface thereof.

13. The fish scaler according to claim 1, wherein the nozzle is directed along the underside surface of the body to direct pressurized water exiting the nozzle along the underside of the body toward the teeth on either side of the body, whereby the pressurized water cleans the teeth as the user performs a scraping action on the fish being cleaned.

14. The fish scaler according to claim 13, wherein the nozzle is located at a remote distance from the teeth, whereby debris from a scraping action performed by a user does not tend to clog the nozzle.

* * * * *